United States Patent
Shah et al.

(10) Patent No.: US 10,475,454 B2
(45) Date of Patent: Nov. 12, 2019

(54) DIRECTIONAL DISPLAY AND AUDIO BROADCAST

(71) Applicant: Motorola Mobility LLC, Chicago, IL (US)

(72) Inventors: Jagatkumar V. Shah, Lake In The Hills, IL (US); Scott Patrick DeBates, Crystal Lake, IL (US); Douglas Alfred Lautner, Round Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 62 days.

(21) Appl. No.: 15/707,034

(22) Filed: Sep. 18, 2017

(65) Prior Publication Data
US 2019/0088257 A1 Mar. 21, 2019

(51) Int. Cl.
| G10L 15/22 | (2006.01) |
| G06F 3/00 | (2006.01) |
| G10L 15/26 | (2006.01) |
| H04R 5/02 | (2006.01) |
| G10L 15/00 | (2013.01) |
| G06F 3/16 | (2006.01) |

(52) U.S. Cl.
CPC .............. *G10L 15/26* (2013.01); *G06F 3/167* (2013.01); *G10L 15/005* (2013.01); *G10L 15/22* (2013.01); *H04R 5/02* (2013.01); *G10L 2015/223* (2013.01)

(58) Field of Classification Search
CPC .................................. G10L 15/22; G06F 3/00
See application file for complete search history.

(56) References Cited

U.S. PATENT DOCUMENTS

| 6,219,645 | B1 * | 4/2001 | Byers | G10L 15/02 381/91 |
| 6,314,364 | B1 * | 11/2001 | Nakamura | B60R 1/00 340/995.13 |
| 8,330,730 | B1 * | 12/2012 | Kurtz | G06F 3/041 345/173 |
| 8,928,579 | B2 * | 1/2015 | Wilson | G06F 3/011 345/156 |
| 9,020,825 | B1 * | 4/2015 | Garber | G06F 3/167 704/231 |
| 9,485,556 | B1 * | 11/2016 | List | H04R 1/00 |
| 10,134,425 | B1 * | 11/2018 | Johnson, Jr. | G10L 25/87 |
| 10,147,439 | B1 * | 12/2018 | Kristjansson | G10L 21/034 |
| 2002/0149613 | A1 * | 10/2002 | Gutta | G06F 3/011 715/728 |
| 2008/0068284 | A1 * | 3/2008 | Watanabe | B60K 35/00 345/1.1 |

(Continued)

*Primary Examiner* — Shreyans A Patel
(74) *Attorney, Agent, or Firm* — SBMC

(57) ABSTRACT

Systems, devices, and techniques for directional display and audio broadcast are described. It is determined whether a spoken query includes an individual query, a group query, and a display request. For an individual query, an audio response is broadcast in a directional manner towards the source of the spoken query. For a group query, an audio response is broadcast in more than one direction, such as towards directions of sources in an environment. For a display request, an image (e.g., picture, video, web page, and the like) is projected on a surface that is detected so the image is viewable by one or more users, such as the source of the spoken query.

20 Claims, 9 Drawing Sheets

(56) References Cited

U.S. PATENT DOCUMENTS

| | | | |
|---|---|---|---|
| 2008/0088587 A1* | 4/2008 | Pryor | H04N 9/3129 345/158 |
| 2009/0030552 A1* | 1/2009 | Nakadai | G06N 3/008 700/258 |
| 2009/0215533 A1* | 8/2009 | Zalewski | A63F 13/00 463/32 |
| 2013/0041665 A1* | 2/2013 | Jang | H04N 21/42203 704/246 |
| 2013/0176351 A1* | 7/2013 | Abele | G09G 3/3406 345/690 |
| 2013/0265226 A1* | 10/2013 | Park | G06F 3/017 345/156 |
| 2013/0278499 A1* | 10/2013 | Anderson | G06F 3/01 345/156 |
| 2014/0078242 A1* | 3/2014 | Onuma | H04M 3/42 348/14.08 |
| 2014/0095174 A1* | 4/2014 | Kim | H04N 5/4403 704/275 |
| 2015/0194152 A1* | 7/2015 | Katuri | G10L 15/22 704/231 |
| 2015/0278998 A1* | 10/2015 | Jothiswaran | G06T 3/60 345/650 |
| 2015/0279369 A1* | 10/2015 | Lee | G06K 9/00288 704/275 |
| 2015/0346845 A1* | 12/2015 | Di Censo | G06F 3/0346 707/766 |
| 2016/0187856 A1* | 6/2016 | Vilermo | G04G 21/025 340/575 |
| 2017/0206900 A1* | 7/2017 | Lee | G10L 15/08 |
| 2017/0242653 A1* | 8/2017 | Lang | H04S 7/301 |
| 2017/0330563 A1* | 11/2017 | Daley | G10L 15/08 |
| 2018/0074785 A1* | 3/2018 | Ohmura | G06F 3/0487 |
| 2018/0122373 A1* | 5/2018 | Garner | G10L 15/22 |

\* cited by examiner

DIRECTIONAL DISPLAY AND AUDIO BROADCAST

BACKGROUND

Echo devices are stationary devices (e.g., placed on a surface, such as a tabletop) that can provide various functions for one or more users in an environment. For instance, echo devices can answer questions posed by a user, read news, report traffic and weather, and the like. However, echo devices do not distinguish between a group query (where the answer to the query is intended to be shared with a group) and an individual query (where the answer to the query is to be provided to the source of the query and not shared with others). Consequently, echo devices usually broadcast an answer to a query in an omni-directional fashion. However, for individual queries that request personal information (e.g., "What is the balance of my bank account?"), it is generally inappropriate to broadcast the answer in an omni-directional way, since this may result in sharing the personal answer with other users proximate to the echo device. Moreover, because echo devices do not distinguish between individual and group queries, echo devices are generally not able to support simultaneous queries from multiple users, while simultaneously providing individual answers to the queries.

Furthermore, echo devices do not support display of information (e.g., images, video, text, and the like) in response to a query. Instead, echo devices are limited to audio answers to queries. Hence, echo devices do not project or display information towards the source of a query, and are thus limited in the type and amount of information they can provide in answer to a query.

Moreover, echo devices are limited to audio input (e.g., a spoken query) and do not provide other forms of input, such as via a keyboard projected from the echo device. Consequently, echo devices are not configured with adequate security for a user to access the echo device.

SUMMARY

This Summary is provided to introduce a selection of concepts in a simplified form that are further described below in the Detailed Description. This Summary is not intended to identify key features or essential features of the claimed subject matter.

This disclosure describes, in some aspects, a method of displaying and inputting data. A spoken query is received, and a direction of a source of the spoken query is obtained. It is determined whether the spoken query contains a display request. Responsive to the determining being that the spoken query does not contain the display request, an audio response to the spoken query is broadcast in the direction of the source. Responsive to the determining being that the spoken query contains the display request, a presence of a surface visible from the source is detected. A display mechanism is configured based on the direction and the surface, and an image is projected, with the display mechanism, on the surface. User input is enabled via the image on the surface.

This disclosure further describes, in other aspects, a device for answering questions. The device comprises a receiver module configured to receive a spoken query in an environment. The device also comprises an environment module configured to determine a number of sources in the environment, and respective directions of the sources. The device also comprises a query module configured to determine whether the spoken query is an individual query or a group query. The device also comprises a speaker module configured to, responsive to the query module determining the spoken query is the individual query, broadcast an audio response to the spoken query in one of the respective directions of one of the sources associated with the spoken query, and responsive to the query module determining the spoken query is the group query, broadcast the audio response in each of the respective directions.

This disclosure further describes, in still other aspects, a system for answering questions. The system comprises a receiver module configured to receive a plurality of spoken queries in an environment. Each query of the spoken queries is from a different source of a plurality of sources in the environment. The system also comprises an environment module configured to determine respective directions for the plurality of the sources. The system also comprises a query module configured to associate each query of the plurality of spoken queries with a respective one of the respective directions. The system also comprises a speaker module configured to broadcast a respective audio response to each one of the plurality of spoken queries. The respective audio response is broadcast in the respective one of the respective directions and not broadcast in other of the respective directions.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
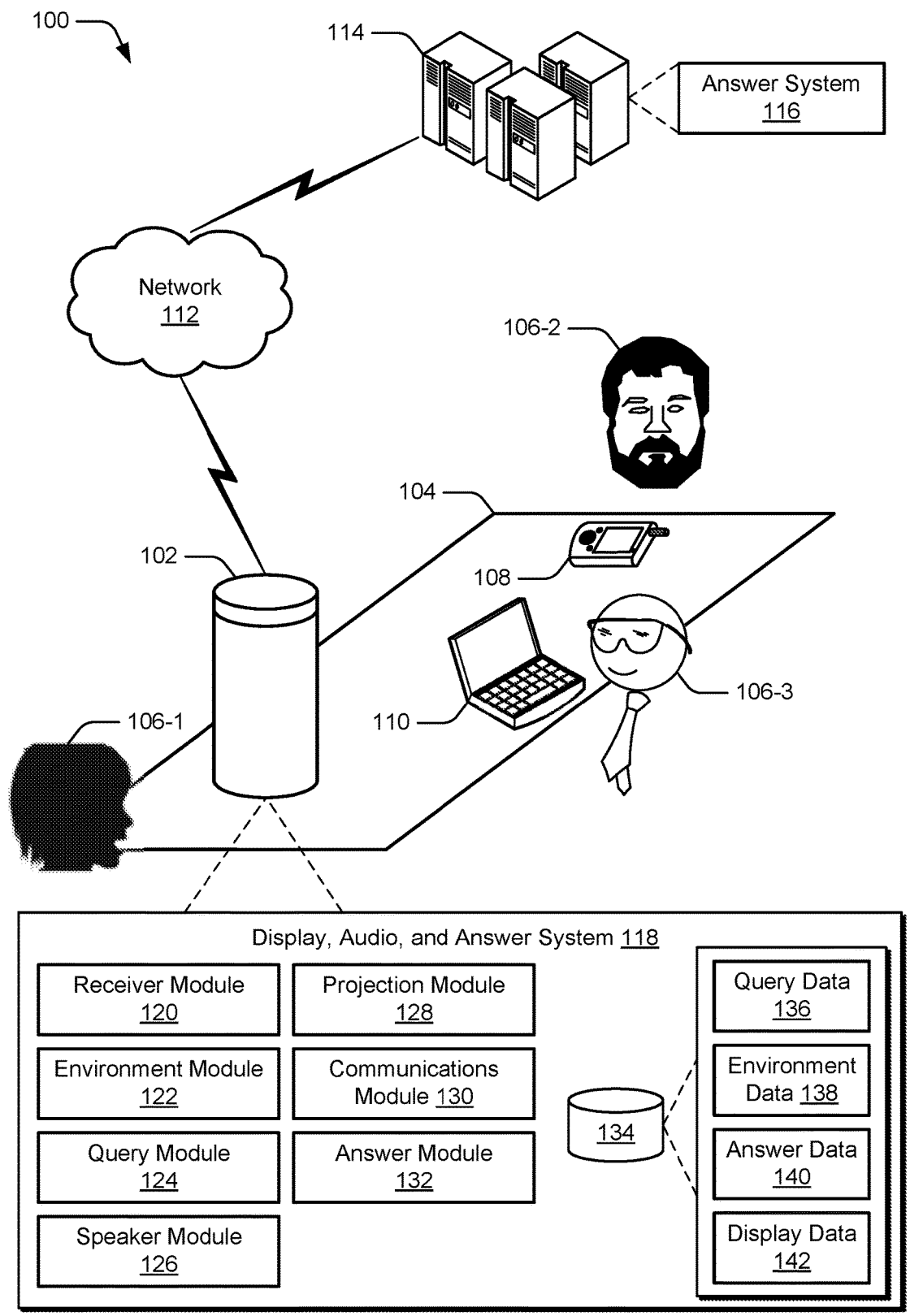
FIG. 1 is an illustration of an example operating environment in accordance with one or more aspects of the disclosure.

Stationary devices can be placed on a surface, such as a table top, and can answer spoken questions posed by a user, read news, report traffic and weather, and the like, and are therefore sometimes referred to as echo devices. However, echo devices do not distinguish between group queries and individual queries. For a group query, the answer to the query is intended to be shared with a group, whereas for an individual query, the answer to the query is to be provided to the source of the query and not shared with others. Consequently, echo devices usually broadcast an answer to a query in an omni-directional fashion, which for individual queries that request personal information, is generally inappropriate. Additionally, echo devices do not support simultaneous queries from multiple users, while simultaneously providing answers to the queries directed to the respective sources of the queries.

Furthermore, echo devices do not display or project information (e.g., images, video, text, and the like) in response to a query, but instead are limited to audio answers to queries (e.g., an audio answer from a loudspeaker). Hence, echo devices do not project or display information towards the source of a query, and are thus limited in the type and amount of information they can provide in answer to a query. Moreover, echo devices are limited to audio input (e.g., a spoken query) and do not provide other forms of input, such as via a keyboard projected from the echo device. Consequently, echo devices are not configured with security features (e.g., user authentication, verification, and the like) when a user accesses the echo device.

Accordingly, this disclosure describes systems, devices, and techniques for determining context of a spoken query, including whether the spoken query includes a display request (e.g., a request to display information) and whether the spoken query includes an individual query or a group query. When the spoken query includes a display request, information is projected on a visible surface, such as surface visible to the source of the spoken query or a user designated by the source of the spoken query. Projecting the information can include rotating a projector towards, and moving the projector closer to a user, such as the source of the spoken query. The projected information can contain an image, video, text, web page, and the like in response to the spoken query. Furthermore, user input is enabled via the projected information on the surface. For instance, infrared (IR) cameras, lasers, motion sensors, or any suitable sensors can be enabled to detect user interaction with the projected information. In one example, the projected information includes a keyboard that is projected on the surface through which a user can input data. Thus, security features can be included that require user authentication via input of the keyboard.

When the spoken query includes an individual query, an answer is broadcast in a direction of the source of the spoken query without being broadcast in directions of other users, such as by suppressing broadcast of the answer in the directions of other users. Hence, personal information can be provided in a broadcast answer without risk of the information being jeopardized (e.g., learned by other users). Multiple individual queries can be simultaneously processed, with multiple answers being directionally broadcast simultaneously to respective multiple users. Multiple languages are supported, so that different questions and respective answers can be in different languages. Languages can be learned from a language of a spoken query, a device of a user, such as a language pack installed on a mobile phone or laptop computer proximate a user, preferences indicated by a user, or combinations thereof.

When the spoken query includes a group query, an answer is broadcast in multiple directions, such as in an omni-directional way or in multiple directions of users in an environment, e.g., users sitting at a conference table. Answers can be directionally broadcast to different users in different languages. For instance, a first user may provide a spoken query in a first language, and an answer to the spoken query can be broadcast to a second user in a second language and to a third user in a third language or the first language.

The systems, devices, and techniques described herein constitute an improvement over current approaches which do not project information related to a spoken query in a direction of a user, and do not distinguish between individual and group queries. By projecting an image, video, text, and the like related to a spoken query in the direction of a source of the spoken query, the systems, devices, and techniques described herein are less limited in the type and amount of information they can provide in answer to the spoken query than current approaches which provide only audio answers to the spoken query. In addition, user input can be enabled via the projected information, unlike current approaches. Furthermore, by distinguishing between individual and group queries, answers can be provided to intended users, without providing the answers to unintended users. Moreover, the answers can be tailored to specific users, such as by formatting the answers broadcast in different directions in different languages.

In the following discussion example environments and an example system are described that may employ the techniques described herein. Example implementation details and procedures are then described which may be performed in the example environments as well as other environments, with the example system as well as other systems. Consequently, performance of the example procedures is not limited to the example environments and example system, and the example environments and example system are not limited to performance of the example procedures.

Example Environments

FIG. 1 is an illustration of an example operating environment 100 in accordance with one or more aspects of the disclosure. The illustrated environment 100 includes a computing device 102 that is configured as an echo device. Computing device 102 can include any suitable computing device that is configured at least temporarily as an echo device, such as an echo device (e.g., a dedicated, stationary echo device), a mobile phone, tablet, laptop computer, gaming device, goggles, glasses, watch, camera, personal digital assistant, access point, projector, and the like. Furthermore, computing device 102 may be representative of one or a plurality of different devices, such as one or more devices connected to a network that perform operations "over the cloud".

In environment 100, computing device 102 is located on surface 104. Surface 104 can be any suitable surface, such as a table top, conference table, desk, chair, podium, stool, kiosk, shelf, screen, wall, ceiling, floor, whiteboard, blackboard, and the like. Hence, surface 104 can be at any suitable angle, such as horizontal, vertical, tilted, and the like. Users 106-1, 106-2, and 106-3 (collectively 106) are proximate to surface 104. In one example, users 106 are seated at a table represented by surface 104. In one example, one of users 106 is a virtual representation of a person or group of persons, such as a video teleconference station. For instance, a person or group of persons may be remote from environment 100, communicatively coupled to environment 100 via a video teleconference system, and represented by one of users 106 in environment 100. Computing device 102 is configurable to receive spoken queries from users 106, broadcast answers to one or more of users 106, and project information related to a spoken query in a direction of one or more of users 106 (discussed below in more detail).

Mobile device 108 is proximate user 106-2, and represents a mobile device of user 106-2, such as a mobile phone, personal digital assistant, and the like. Device 110 is proximate user 106-3, and represents a device of user 106-3, such as a laptop, tablet, and the like. Generally, mobile device 108 and device 110 can be any suitable device associated with a user, such as a mobile phone, tablet, laptop computer, desktop computer, gaming device, goggles, glasses, watch, camera, personal digital assistant, and the like. In one example, computing device 102 is communicatively coupled to mobile device 108 and device 110, and has access to information on mobile device 108 and device 110, such as language packs that are installed on mobile device 108 and device 110 to determine what languages mobile device 108 and device 110 use.

Computing device 102 is communicatively coupled to network 112. Network 112 communicatively couples computing device 102 with server 114. Network 112 may comprise a variety of networks, including the Internet, an intranet, local area network (LAN), WLAN, wide area network (WAN), personal area network (PAN), cellular networks, terrestrial networks, satellite networks, combinations of networks, and the like, and as such may be wired, wireless, or a combination thereof.

Server 114 may include one or more servers or service providers that provide services and/or resources to computing device 102. Generally, resources provided by server 114 may be licensed, purchased, or may be made freely available, (e.g., without authentication, license, or account-based access). The resources can include any suitable combination of services and content, such as made available over network 112 by one or more providers. Some examples of services include, but are not limited to, an online shopping service, a photo editing service, a web development and management service, a collaboration service, a social networking service, a messaging service, an advertisement service, a graphics design service, a search service, and so forth. Content may include various combinations of assets, including videos, ads, audio, multi-media streams, animations, images, web documents, web pages, applications, device applications, text documents, drawings, presentations, user profiles, user preferences, user data, maps, books, music, and the like.

Furthermore, server 114 includes answer system 116 configurable to receive information (e.g., information regarding a spoken query from computing device 102), determine information regarding an answer to the spoken query, and provide the information regarding the answer to computing device 102 for distribution to one or more of users 106. In one example, answer system 116 provides contextual analysis regarding a spoken query, and provides results of the contextual analysis to computing device 102 via network 112. The results of the contextual analysis can include a determination whether a spoken query contains a display request, whether the spoken query is an individual query, whether the spoken query is a group query, whether the spoken query requests personal information, combinations thereof, and the like. Accordingly, answer system 116 can offload processing of display, audio, and answer system 118 included in computing device 102.

Computing device 102 includes display, audio, and answer system 118. Display, audio, and answer system 118 is illustrated in FIG. 1 as part of computing device 102, though display, audio, and answer system 118 can be implemented in any suitable computing device. In one example, answer system 116 of server 114 may include display, audio, and answer system 118 in part or in whole so that display, audio, and answer system 118 can be implemented by computing device 102, server 114, or combinations thereof.

Display, audio, and answer system 118 includes receiver module 120, environment module 122, query module 124, speaker module 126, projection module 128, communications module 130, and answer module 132. Display, audio, and answer system 118 also includes, or has access to, data storage 134, which can store any suitable type of data, including query data 136, environment data 138, answer data 140, display data 142, applications, instructions for translating from one language to another language, mobile device data (e.g., data associated with mobile device 108 or device 110), and the like.

Receiver module 120 is representative of functionality configured to receive speech, such as a spoken query from a user (e.g., one or more of users 106), and provide the spoken query to modules of display, audio, and answer system 118 for processing. Accordingly, receiver module 120 includes or has access to a microphone array of computing device 102 (discussed in more detail below). Receiver module 120 is also representative of functionality to receive input from a user, such as input via a keyboard projected on surface 104 by computing device 102. For instance, input can be received by receiver 120 using any suitable sensors, such as IR sensors, lasers, cameras, and the like.

In one example, receiver module 120 can simultaneously receive multiple spoken queries from multiple different sources in multiple different directions, and keep the received spoken queries separate from each other. For instance, receiver 120 can suppress leakage of one spoken query onto another spoken query, such as by applying adaptive filters to received spoken queries for source separation.

Environment module 122 is representative of functionality configured to determine information (e.g., environment data) regarding environment 100 and users 106 in environment 100. Environment module 122 can obtain any suitable environment data needed by display, audio, and answer system 118, including a number of sources (e.g., users) in environment 100, respective directions of the sources (e.g., angles and distances relative to the position of computing device 102 in environment 100), two-dimensional (2D) and/or three-dimensional (3D) locations of sources in environment 100, a size of surface 104, languages used by sources 106, and the like. Environment data obtained by environment module 122 can be stored in environment data 138 in data storage 134.

Environment data obtained by environment module 122 can be obtained in any suitable way, such as from speech provided to receiver module 120, a spoken query provided by receiver module 120, device data obtained by communications module 130 (e.g., data from mobile device 108 or device 110), thermal sensors on computing device 102 that detect heat signatures of users 106, a camera system (e.g., including a 360-degree camera) that captures images of users 106, sensors placed on surface 104 (not shown for simplicity) that detect when a user is present at surface 104 (e.g., weight sensors) and communicate the detection of a user to computing device 102, motion sensors, users 106 indicating their presence and position in environment 100 (e.g., by indicating a seat number, desk number, or any suitable indicator of location in environment 100), combinations thereof, and the like. In one example, environment module 122 performs direction-of-arrival calculations on signals from multiple microphones of an array of microphones to determine an angle from the spoken query. The angle can indicate a direction of a vector in 2D or 3D from computing device 102 to a source of a spoken query in environment 100 (e.g., one of users 106).

Query module 124 is representative of functionality configured to determine context of a spoken query. For instance, query module 124 can perform any suitable processing on a spoken query to provide query data, such as speech recognition (e.g., identification of text of a spoken query), speaker identification (e.g., obtaining an identity of a source of a spoken query that distinguishes that source from others in environment 100, such as a name of a person, employee number, and the like), trigger word identification, language analysis to determine a language and/or dialect (e.g., regional version of a language) of a spoken query, determining whether a spoken query contains a display request, determining whether a spoken query contains an individual query, determining whether a spoken query contains a group query, and the like. Query data can include any suitable data regarding a spoken query, such as an indicator that a spoken query contains or does not contain an individual query, an indicator that a spoken query contains or does not contain a group query, an indicator that a spoken query contains or does not contain a display request, an indicator to designate to which one or more of users 106 to broadcast an audio response, an indicator to designate which one or more of users 106 are to be shown data projected by computing device 102 (e.g., to project an image to a source of a spoken query, or a user of users 106 who did not utter the spoken query). For instance, query data may include an indicator to project an image related to a spoken query to user 106-2 when user 106-1 speaks the spoken query. Query data may also include an indicator of a language and/or dialect of a spoken query. Query data obtained by query module 124 can be stored in query data 136 in data storage 134 and made available to display, audio, and answer system 118.

In one example, query module 124 identifies trigger words in a spoken query to determine whether the spoken query includes a display request, an individual query, and/or a group query. For instance, a display request may be identified by trigger words such as "show", "display", "project", "play", and the like. An individual request may be identified by trigger words indicating a singular user, such as "I", "me", "one", or "personal", and a group request may be identified by trigger words indicating plural users, such as "we", "us", "all", or "group". In one example, "show me" indicates to display or project an image to a source of a spoken query, and "show us" indicates to display or project an image to more than one of users 106, such as all of users 106.

Furthermore, query module 124 can be configured to simultaneously process multiple spoken queries, and simultaneously determine contexts of the multiple spoken queries. In one example, one query of the multiple spoken queries is in a first language, and at least another query of the multiple spoken queries is in another language different from the first language.

Speaker module 126 is representative of functionality configured to broadcast audio, such as an answer to a spoken query. Accordingly, speaker module 126 may contain or have access to a speaker array (e.g., an array of multiple loudspeakers) that can be electronically and/or mechanically steered to broadcast audio in a specific direction, while suppressing broadcast of the audio in other directions. For instance, an audio response or answer to a spoken query may be directed to a source of the spoken query and suppressed in other directions (e.g., in directions of other users). In one example, an answer to a spoken query is broadcast from computing device 102 in a direction of user 106-1, while broadcast of the answer is suppressed in the directions of user 106-2 and user 106-3. Hence, user 106-1 can hear personal information in the broadcast audio, while users 106-2 and 106-3 cannot hear the personal information in the broadcast audio.

Speaker module 126 can simultaneously broadcast different answers to different spoken queries in different directions, while suppressing the broadcast of respective answers in directions of sources not responsible for the respective spoken query. For instance, an answer to a spoken query from user 106-1 can be broadcast to user 106-1, but suppressed in a direction of user 106-2. Simultaneously, an answer to a spoken query from user 106-2 can be broadcast to user 106-2, but suppressed in a direction of user 106-1.

Moreover, speaker module 126 can broadcast an audio answer to a spoken query in an omni-directional manner (e.g., no directions are suppressed relative to other directions). An omni-directional broadcast of an audio answer may be done when query data indicates a spoken query is a group query. In one example, when query data indicates a spoken query is a group query, audio answers are broadcast in the directions of users 106 while broadcast in directions other than in the directions of users 106 is suppressed.

Furthermore, speaker module 126 can broadcast an audio suggestion or prompt to display or project an image, video, text, and the like. For instance, when query data indicates that a spoken query does not contain a display request, speaker module 126 may suggest to a source of the spoken query to display an image regarding the spoken query. In one example, use 106-1 asks a spoken query "How big is Mount Rushmore?" and speaker module 126 may prompt user 106-1 with a directional audio response "Would you like to see a picture of Mount Rushmore?". If user 106-1 replies affirmatively, speaker module 126 may communicate to projection module 128 to project an image of Mount Rushmore in a direction of user 106-1.

Speaker module 126 may also broadcast an audio prompt that a suitable surface cannot be detected. The audio prompt may indicate that computing device 102 needs to be adjusted, moved, or otherwise reconfigured so that a suitable surface can be detected.

Projection module 128 is representative of functionality configured to project an image on a surface, such as surface 104. Furthermore, projection module 128 can detect a presence of a surface, such as a surface visible from a source of a spoken query. Projection module 128 can detect a presence of a surface in any suitable way, such as with a camera, broadcasting audio signals and measuring reflections of the audio signals from a surface, radio frequency (RF) pings (e.g., radar), mechanical sensors (e.g., a mechanical arm disposed on computing device 102 configurable to move along a surface and detect the surface's edges), combinations thereof, and the like.

Projection module 128 can also configure a display mechanism, such as one or more projectors, to project one or more images (e.g., pictures, videos, text, documents, web pages, artwork, a keyboard, and the like) on the surface. For instance, a display mechanism can be configured based on a direction of a source of a spoken query obtained by environment module 122 and the surface detected by projection module 128 to project an image in the direction of the source of the spoken query on the surface. Configuring the display mechanism can be done in any suitable way, such as opening the display mechanism, rotating computing device 102, moving computing device 102 (e.g., sliding computing device 102 on a track on surface 104, rolling computing device 102 on wheels disposed on computing device 102, and the like), selecting one or more projectors from a plurality of projectors disposed on computing device 102, combinations thereof, and the like.

Furthermore, projection module 128 can performs image compensation before projecting an image on a surface. In one example, projection module 128 performs image compensation by pre-warping (e.g., intentionally distorting) an image before it is projected onto a surface so that the image on the surface is a predetermined shape or aspect ratio, such as a 16:9 rectangle on the surface. Compensation can be based on an angle and a distance, such as an angle of projection (e.g., an angle between the surface and a vector from the image on the surface to a projector on computing device 102) and a distance from computing device 102 to a point of projection (e.g., the center of the projected image on the surface). Additionally or alternatively, compensation can include offsetting an image in a direction (e.g., shifting it left or right) relative to an original image (e.g., the un-shifted image). Projection module 128 can project the offset image and the original image simultaneously and in a same direction so that when viewed on the surface, the combination of the offset image and the original image adds depth (e.g., a user can see a 3D image when viewing the simultaneously projected images).

In one example, projection module 128 adjusts a language of text included in an image projected on a surface. For instance, projection module 128 can set a language of text included in an image projected on a surface based on an indicator of language included in query data provided from query module 124.

Projection module 128 can also enable user input via an image on a surface. For instance, projection module 128 can enable an IR camera and lasers to determine user input, such as caused when a user, e.g., one of users 106, moves a hand on the image on the surface. In one example, projection module 128 projects a keyboard, and input on the keyboard is detected with at least one IR camera and at least one laser.

Data needed or used by projection module 128, such as surface data (e.g., a size of surface 104), angles of projection, directions and distances to users 106, locations of users 106, pre-warping and compensation data (e.g., parameters of a pre-warping algorithm used to distort an image before the image is projected), languages, language translation algorithms, and the like can be stored in display data 142 in data storage 134, and provided to any suitable module of display, audio, and answer system 118 and/or other component of computing device 102.

Communications module 130 is representative of functionality configured to obtain device data from one or more devices, such as mobile device 108 and device 110. For instance, computing device 102 can be communicatively coupled to mobile device 108 and device 110 (e.g., wired, wirelessly, or a combination thereof) to obtain device data. Device data obtained by communications module 130 can be any suitable data, such as an indication of a language pack installed on a device, location data of a device (e.g., GPS coordinates of mobile device 108 and device 110), user preferences (e.g., a language preferred by a user, font size and type, color, line spacing), and the like.

In one example, projection module 128 projects an image on a surface in a direction determined by device data obtained by communications module 130. For instance, communications module 130 can obtain GPS coordinates from mobile device 108 and projection module 128 can project an image on surface 104 in a direction of the GPS coordinates, or a direction offset from the GPS coordinates (such as proximate mobile device 108 so that mobile device 108 does not interfere with the projected image). Additionally or alternatively, speaker module 126 can broadcast audio in a direction determined by device data obtained by communications module 130, such as in a direction of GPS coordinates, or offset from GPS coordinates (e.g., towards an ear of user 106-2).

Answer module 132 is representative of functionality configured to obtain answer data. Answer data can include any data in response to a spoken query, such as audio, video, images, text, web pages, maps, application files, driver files, presentations, and the like. In one example, a spoken query includes an individual query "Can I climb Mount Rushmore?", and answer module 132 obtains answer data including an individual audio response "No, one is not permitted to climb Mount Rushmore", an image of Mount Rushmore, a web-page describing Mount Rushmore, text describing the laws and fines associated with climbing Mount Rushmore, and a map from a location of the source of the spoken query to Mount Rushmore. Answer data obtained by answer module 132 can be stored in answer data 140 in data storage 134, and provided to speaker module 126 and projection module 128. In one example, answer module 132 obtains answer data from a remote device (e.g., not collocated with computing device 102), such as server 114 via network 112.

Figure 2:
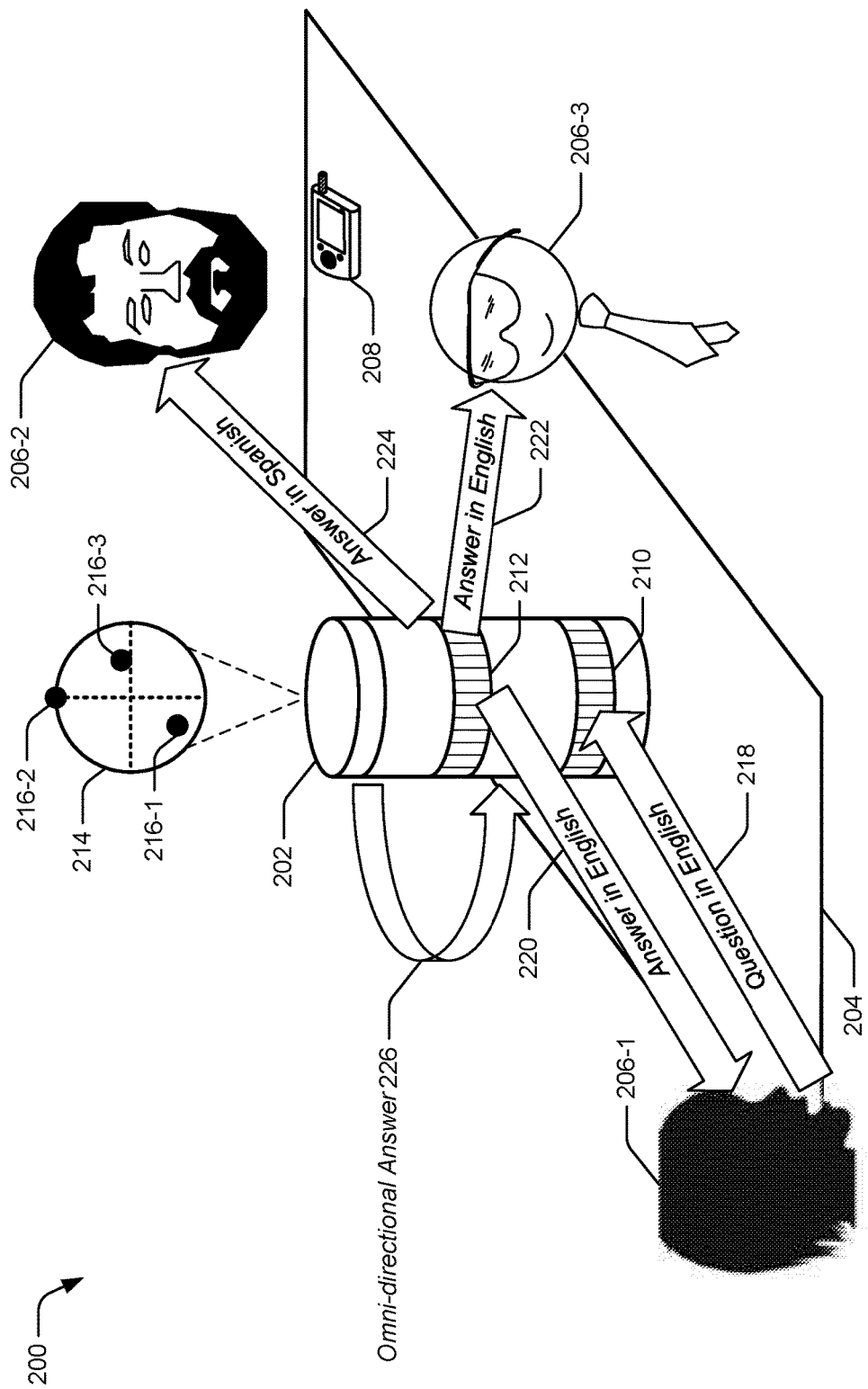
FIG. 2 is an illustration of an example operating environment with a group query in accordance with one or more aspects of the disclosure.

FIG. 2 is an illustration of an example operating environment 200 with a group query in accordance with one or more aspects of the disclosure. Environment 200 includes computing device 202 located on surface 204, which is surrounded by user 206-1, user 206-2, and user 206-2 (collectively 206). Computing device 202 is an example of computing device 102, surface 204 is an example of surface 104, and users 206 are examples of users 106 in FIG. 1. Moreover, user 206-2 possesses mobile device 208, which is an example of mobile device 108 in FIG. 1.

Computing device 202 includes microphone array 210 and speaker array 212. Furthermore, computing device 202 obtains and stores location data 214 of users 206 in environment 200. In this example, for simplicity, location data 214 is illustrated as a 2D map of users 206 in environment 200. However, location data can also include a 3D map of users 206 in environment 200. For instance, designators 216-1, 216-2, and 216-3 indicate locations relative to computing device 202 of user 206-1, user 206-2, and user 206-3, respectively, in a polar diagram. Location data 214 can be obtained in any suitable way, such as with a thermal imaging device, a camera system, from device data (e.g., device data of mobile device 208 indicating a GPS position), and the like, as discussed above.

In the example in FIG. 2, user 206-1 speaks spoken query 218 in the English language, which is received by microphone array 210. Computing device 202 processes spoken query 218 and determines that spoken query 218 includes a group query. For instance, computing device 202 may detect the presence of one or more trigger words, such as "we", "us", or "group", in spoken query 218. Computing device 202 obtains an answer to spoken query 218, and because spoken query 218 includes a group query, computing device 202 provides an answer to spoken query 218 to users 206.

In one example, computing device 202 provides directional answers to spoken query 218 to users 206. For instance, answer 220 in English is broadcast from speaker array 212 in a direction of user 206-1, answer 222 in English is broadcast from speaker array 212 in a direction of user 206-3, and answer 224 in Spanish is broadcast from speaker array 212 in a direction of user 206-2. In this example, computing device 202 has knowledge of a preferred language of user 206-2 (e.g., Spanish), which can be obtained in any suitable way, such as from device data obtained from mobile device 208, as described above. Because answers 220, 222, and 226 are directional answers, they are broadcast in the respective directions of users 206-1, 206-2, and 206-3 while being suppressed in other directions. Hence, users 206-1 and 206-3 are not able to hear answer 224. Likewise, user 206-2 is not able to hear answers 220 and 222, and user 206-3 is not able to hear answers 220 and 224.

Additionally or alternatively, because spoken query 218 includes a group query, computing device 202 can broadcast an omni-directional answer 226 to spoken query 218. Omni-directional answer 226 is broadcast with a same amplitude level in more than one direction, such as all directions in a plane (e.g., a plane parallel to surface 204) or all directions in environment 200. Computing device 202 can determine to broadcast an omni-directional answer 226 to spoken query 218 including a group query based on languages of users 206. For instance, if all languages of users 206 are a same language, computing device 202 may determine to broadcast omni-directional answer 226. However, if all languages of users 206 are not a same language, computing device 202 may determine to broadcast directional answers 220, 222, and 224.

Figure 3:
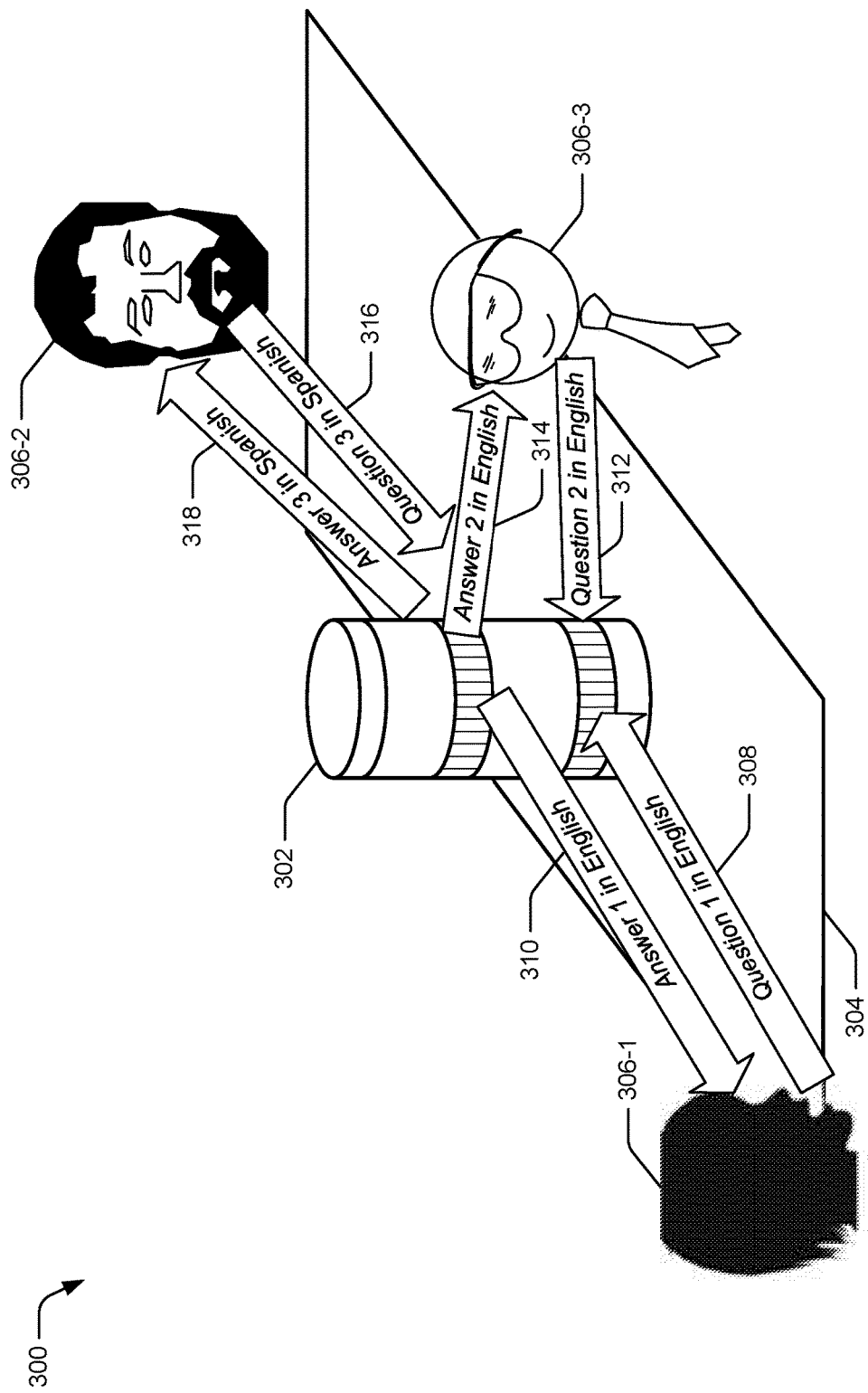
FIG. 3 is an illustration of an example operating environment with an individual query in accordance with one or more aspects of the disclosure.

FIG. 3 is an illustration of an example operating environment 300 with an individual query in accordance with one or more aspects of the disclosure Environment 300 includes computing device 302 located on surface 304, which is surrounded by user 306-1, user 306-2, and user 306-2 (collectively 306). Computing device 302 is an example of computing device 102 in FIG. 1 and computing device 202 in FIG. 2. Moreover, surface 304 is an example of surface 104, and users 306 are examples of users 106 in FIG. 1.

In the example in FIG. 3, user 306-1 speaks first spoken query 308 in English, which is received by a microphone array of computing device 302. Computing device 302 processes first spoken query 308 and determines that first spoken query 308 includes an individual query. For instance, computing device 302 may detect the presence of one or more trigger words, such as "I", "me", or "one", in first spoken query 308. Computing device 302 obtains an answer to first spoken query 308, and because first spoken query 308 includes an individual query, computing device 302 broadcasts first answer 310 in English in a direction of user 306-1, while suppressing broadcast of first answer 310 in other directions, such as in directions of users 306-2 and 306-3.

User 306-3 speaks second spoken query 312 in English, which is received by a microphone array of computing device 302. Computing device 302 processes second spoken query 312 and determines that second spoken query 312 includes an individual query. Computing device 302 obtains an answer to second spoken query 312, and because second spoken query 312 includes an individual query, computing device 302 broadcasts second answer 314 in English in a direction of user 306-3, while suppressing broadcast of second answer 314 in other directions, such as in directions of users 306-1 and 306-2.

Furthermore, user 306-2 speaks third spoken query 316 in Spanish, which is received by a microphone array of computing device 302. Computing device 302 processes third spoken query 316 and determines that third spoken query 316 includes an individual query. Computing device 302 obtains an answer to third spoken query 316, and because third spoken query 316 includes an individual query, computing device 302 broadcasts third answer 318 in Spanish in a direction of user 306-2, while suppressing broadcast of third answer 318 in other directions, such as in directions of users 306-1 and 306-3.

In one example, computing device 302 receives first spoken query 308, second spoken query 312, and third spoken query 316 simultaneously (e.g., users 206 are speaking at the same time). In response, computing device 302 can broadcast first answer 310, second answer 314, and third answer 318 to respective users 306-1, 306-3, and 306-2 simultaneously (so that there is at least one moment in time when first answer 310, second answer 314, and third answer 318 are all being broadcast by a speaker array of computing device 302). Additionally or alternatively, computing device 302 can stagger the broadcast of first answer 310, second answer 314, and third answer 318, such as by broadcasting first answer 310, then broadcasting second answer 314, and then broadcasting third answer 318. Staggered broadcast answers may or may not overlap in time.

Figure 4:
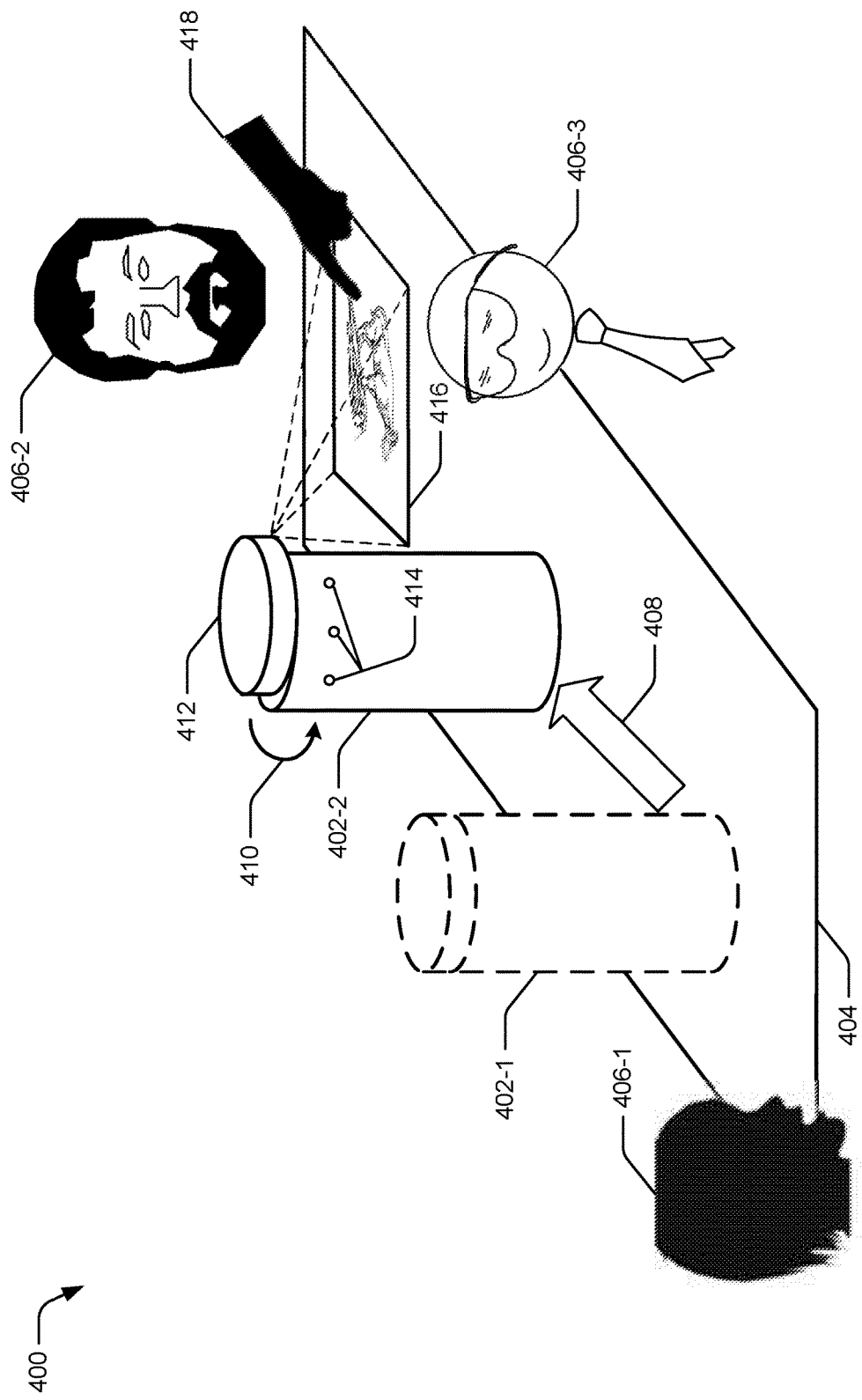
FIG. 4 is an illustration of an example operating environment with a display request in accordance with one or more aspects of the disclosure.

FIG. 4 is an illustration of an example operating environment 400 with a display request in accordance with one or more aspects of the disclosure. Environment 400 includes a computing device (designated as 402-1 in a first position and 402-2 in a second position, and collectively as 402) located on surface 404, which is surrounded by user 406-1, user 406-2, and user 406-2 (collectively 406). Computing device 402 is an example of computing device 102 in FIG. 1, computing device 202 in FIG. 2, and computing device 302 in FIG. 3. For simplicity, computing device 402 is illustrated without a microphone array and speaker array, though it is understood that computing 402 includes a microphone array and speaker array similar to microphone array 210 and speaker array 212 of computing device 202 in FIG. 2. Moreover, surface 404 is an example of surface 104, and users 406 are examples of users 106 in FIG. 1.

In the example in FIG. 4, arrow 408 indicates that computing device 402-1 in a first position moves to a second position, where it is designated as computing device 402-2. Movement indicated by arrow 408 can be for any suitable reason, such as user 406-1 speaking a display request to computing device 402-1 to project an image to a next user located at surface 404, such as user 406-2, user 406-2 speaking a display request to computing device 402-1 (e.g., "show me . . . "), and the like. Furthermore, movement indicated by arrow 408 can be by any suitable means, such as wheels disposed on computing device 402 (not shown for simplicity), a track or groove disposed on surface 404 with complementary groove or track disposed on the bottom of computing device 402 (not shown for simplicity), magnetic propulsion, a user manually moving computing device 402, and the like.

Computing device 402 may also rotate, as indicated by arrow 410. For instance, computing device 402 can rotate clockwise or counter clockwise. In the example in FIG. 4, computing device 402-2 at a second position is rotated counter clockwise (as viewed from above) compared to computing device 402-1 at a first position, as indicated by the direction of arrow 410. Rotation can be by an suitable means, such a one or more balls, pads, or discs disposed on the bottom of computing device 402 that can turn independently from each other to cause computing device 402 to rotate, a user manually rotating computing device 402, and the like.

Computing device 402 may also include one or more display mechanisms, such as projectors. For instance, to project an image, computing device 402-2 is illustrated as including two types of display mechanisms, 412 and 414. Display mechanism 412 opens from computing device 402-2, such as by rotating and/or sliding from computing device 402-2, to expose a projector that projects image 416 onto surface 404, viewable to user 406-2. Additionally or alternatively, computing device 402-2 can include display mechanism 414 including a plurality of projectors spaced around computing device 402-2 (e.g., spaced at even intervals around the circumference of computing device 402-2). Computing device 402-2 may select one or more of projectors included in display mechanism 414, rotate itself to an appropriate orientation (e.g., so that one of the projectors included in display mechanism 414 faces user 406-2), and project an image onto surface 404, such as image 416.

Image 416 can be any suitable image, such as a video, picture, text, map, web page, file, spreadsheet, and the like. In the example in FIG. 4, image 416 displays a picture of an animal Image 416 can be displayed in response to computing device 402 receiving a spoken query, such as a spoken query including a display request, such as "Show me a picture of a mountain goat". Furthermore, text of an image 416 may be formatted to be in a same language as a spoken query received by computing device 402. For instance, if the spoken query is in Spanish, text of image 416 is translated to Spanish before it is projected onto surface 404.

Moreover, computing device 402 can enable user input via image 416. For instance, computing device 402 can enable one or more IR cameras and lasers when image 416 is projected, so that when an object is passed over or onto image 416, an input is detected. In the example in FIG. 4, user 406-2 is illustrated as interacting with image 416 by placing a hand 418 with an extended finger onto image 416, e.g., to select an input option on image 416. In one example, image 416 includes at least one of a keyboard, keypad, alphanumeric keys (e.g., a phone number entry pad), a scroll bar, next and/or previous selections, and controls for adjusting a size, font, color, text, and the like of image 416. Additionally or alternatively, a user may be required to be verified by entering an authorization code (e.g., a password) via image 416 to communicate with computing device 402, such as to provide computing device 402 with a spoken query, be provided with an answer to a spoken query, to enable projection of an image related to a spoken query, and the like.

Furthermore, as discussed above, computing device 402 may compensate for artifacts of projection before projecting image 416, such as an angle or distance that may result in a non-regular or otherwise distorted image on surface 404. For instance, without compensation, image 416 projected onto surface 404 may appear as a trapezoidal shape, while with compensation applied by computing device 402, image 416 projected onto surface 404 may appear as a rectangle. Furthermore, compensating for artifacts of projection may include adjusting a brightness or contrast of image 416 based on a reading of ambient light in environment 400, an indication of reflectivity of surface 404, a setting indicated by user 406-2, combinations thereof, and the like.

Though computing device 402-2 is illustrated in FIG. 4 as projecting an image in a direction of a single user (e.g., user 406-2), computing device can project multiple images in multiple directions. In one example, computing device 402-2 projects different images in different directions (e.g., directions of users 406). In another example, computing device 402-2 projects a same image in different directions (e.g., a same image projected in directions of each of users 406). Additionally or alternatively, computing device 402-2 can project an image on a surface visible to a plurality of users in an environment, such as a wall or ceiling viewable to all users in a conference room.

Multiple computing devices can be communicatively coupled and located on surface 404. In one example, instead of computing device 402 being designated as 402-1 in a first position and 402-2 in a second position, computing device 402-1 and computing device 402-2 can represent different computing devices that are communicatively coupled, and operate in concert to project multiple images. In this example, computing device 402-1 may project an image to user 406-1 since it is closer to user 406-1 than computing device 402-2, while computing device 402-2 can project same or different images to user 406-2 and user 406-3 since it is closer to user 406-2 and user 406-3 than computing device 402-1.

Having considered example operating environments, consider now a discussion of an example system usable for directional display and audio broadcast in accordance with one or more aspects of the disclosure.

Example Display, Audio, and Answer System

Figure 5:
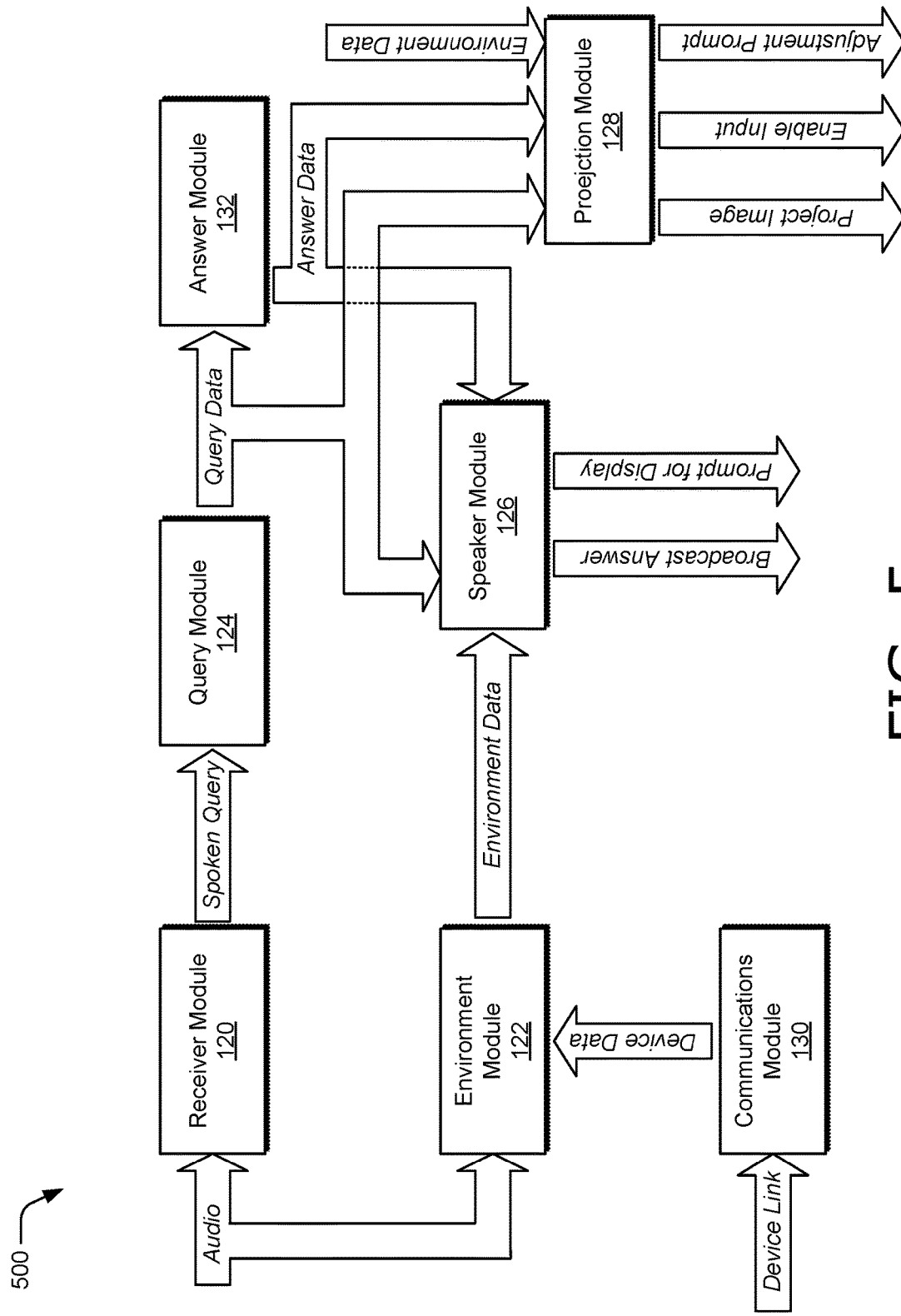
FIG. 5 illustrates an example system in accordance with one or more aspects of the disclosure.

FIG. 5 illustrates an example system 500 usable for directional display and audio broadcast in accordance with one or more aspects of the disclosure. In this implementation, system 500 includes the modules of display, audio, and answer system 118 as described in FIG. 1, e.g., receiver module 120, environment module 122, query module 124, speaker module 126, projection module 128, communications module 130, and answer module 132. System 500 is one example of display, audio, and answer system 118 that can be constructed using the modules of display, audio, and answer system 118. For instance, signals can be redefined, and modules can be modified, added, deleted, combined, or divided to form a modified system, without altering the functionality of system 500. Accordingly, such modified systems are considered to be within the scope of the disclosure.

Furthermore, for simplicity system 500 is limited to the modules of display, audio, and answer system 118 and a description of some of their interconnects. System 500 can, however, include any suitable signals and communications between modules omitted for simplicity. Such signals may include system clocks, counters, start and stop indicators, reset signals, user inputs, beamforming parameters, control words, and the like.

Moreover, system 500 can be implemented on any suitable device or devices. In one example, system 500 is implemented on one computing device, such as computing device 102 in FIG. 1. Additionally or alternatively, system 500 can be implemented on more than one device. For instance, parts of system 500 can be implemented by a first computing device, such as computing device 102 in FIG. 1, and other parts of system 500 can be implemented by an additional computing device or devices. In one example, a server implements parts of system 500, such as server 114 in FIG. 1. The server can be remote from the first computing device, e.g., not collocated with the first user computing device. The server may be configured to receive signals of system 500 from the first computing device, process the received signals, such as with answer system 116, and transmit results of the processing back to the first computing device. Hence, answer system 116 of server 114 in FIG. 1 may include system 500.

Additionally or alternatively, parts of system 500 can be implemented by an additional computing device that is collocated with the first computing device, such as in a same room or building. For instance, computing device 102 may be communicatively coupled to one or more other computing devices, such as mobile device 108 and device 110, which share or divide processing requirements of system 500. For instance, computing device 102 may be coupled to device 110 and determine that device 110 includes more available processing resources than computing device 102, and responsive to this determination, processing for parts of system 500 may be offloaded from computing device 102 to device 110, or any other suitable device.

In system 500, receiver module 120 receives audio data. Audio data can be received from a user in the form of one or more spoken queries. Hence, receiver module 120 includes or has access to one or more microphones. In one example, receiver module 120 receives audio data including a plurality of spoken queries in an environment, each query of the spoken queries from a different source of a plurality of sources in the environment. Receiver module 120 provides one or more spoken queries obtained from the received audio data to query module 124.

Query module 124 receives a spoken query from receiver module 120 and performs contextual analysis on the spoken query to determine whether the spoken query is an individual query or a group query and whether the spoken query contains a display request. Contextual analysis performed by query module 124 may include any suitable processing, such as analyzing a spoken query to determine if the spoken query includes one or more trigger words. Hence, query module 124 can be configured to perform speech recognition on a spoken query (e.g., transforming the speech to text) and to identify a language of the spoken query. Moreover, query module 124 may determine a source (e.g., a user) for a spoken query by performing speaker identification.

Furthermore, query module 124 may associate each query of a plurality of spoken queries received from receiver module 120 with a respective direction obtained by environment module 122. Hence, query module 124 may associate each query of a plurality of spoken queries received from receiver module 120 with a respective source (e.g., user) based on a respective direction, results of speaker identification, combinations thereof, and the like.

Query module 124 generates query data. As discussed above, query data can include any suitable data regarding a spoken query, such as data obtained by query module 124 when performing contextual analysis of a spoken query. In one example, query data includes indicators of a presence and/or absence of an individual query, group query, display request, or combinations thereof. Query data may also include an indicator of a user, such as a user to whom an image is to be projected and/or a user who is a source of a spoken query. Query data can also include an indicator of a language of a spoken query.

In one example, query data generated by query module 124 is arranged into a data structure, such as by populating respective data fields of the data structure with respective results of contextual analysis performed by query module 124. For instance, a source language field may be populated with a language of a source of spoken query (e.g., English), and a destination language field may be populated with a language for an answer to a spoken query (e.g., Spanish). Another data field of the data structure may be populated with an indicator of "individual" or "group" to designate that a spoken query contains an individual query or a group query, respectively. Still another data field of the data structure may be populated with an indicator of whether a spoken query includes a display request. Additionally or alternatively, a data field may include an indicator that an answer to a spoken query is to be broadcast in an omni-directional manner or a directional manner (e.g., towards a specific user, but not towards other users). In one example, a data field is populated with text of a spoken query obtained by query module 124, such as by performing speech recognition on the spoken query. Query module 124 provides query data to answer module 132, speaker module 126, and projection module 128.

Answer module 132 receives query data from query module 124 and generates answer data. Answer data can include any data regarding a spoken query, such as audio, video, music (audible and/or scored), images, text, web pages, maps, application files, driver files, and the like. Answer module 132 can obtain answer data in any suitable way. In one example, answer data performs a search to obtain answer data, such as a search of a database, an Internet-based search (e.g., using a publicly available search engine), combinations thereof, and the like. For instance, answer module 132 can parse text of a spoken query obtained in query data into one or more search terms (e.g., a search term including one or more words of the spoken query) and use a search term to perform a search. Additionally or alternatively, answer module 132 can obtain answer data from one or more computing devices, such as a server (e.g., server 114 in FIG. 1) or a computing device of a user (e.g., mobile device 108 and device 110 in FIG. 1). Answer module 132 provides answer data to speaker module 126 and projection module 128.

Communications module 130 obtains device data from one or more computing devices, such as mobile device 108 and device 110 in FIG. 1, via a device link with one or more computing devices. For instance, a device link may include a wired or wireless communication link. In one example, a device link includes a low power data link, such as according to a Bluetooth® protocol. Additionally or alternatively, a device link can include a Wi-Fi communication link. Device data obtained by communications module 130 can be any suitable data, such as an indication of a language pack installed on a device, location data of a device (e.g., GPS coordinates), user preferences (e.g., a language indicated by a user of a device, a desired font size and type, display colors, etc.), and the like. Device data obtained by communications module 130 is provided to environment module 122.

Environment module 122 receives device data from communications module 130 and audio data that is also provided to receiver module 120, and determines environment data. Environment data can include any suitable data for directional display and audio broadcast, including a number of sources (e.g., users) in an environment, respective directions of the sources, locations of the sources, a size of a surface in an environment, a number of surfaces in an environment, languages used, preferred, or used and preferred by sources, and the like. As such, environment data may include or have access to any suitable type of sensor, such as a microphone array, camera system, thermal imaging system, and the like. In one example, environment module 122 tracks sources in an environment and dynamically updates environment data. For instance, if a user in an environment moves within the environment, such as to a whiteboard in a conference room, environment module 122 adjusts environment data to indicate the user has moved, such as by changing a direction or location of the user, and provides the updated environment data to system 500.

Speaker module 126 receives environment data from environment module 122, query data form query module 124, and answer data from answer module 132. Speaker module 126 broadcasts an audio response to a spoken query based on the environment data, query data, and answer data. In one example, responsive to a spoken query not containing a display request, speaker module 126 broadcasts an audio response the spoken query in a direction of a source of the spoken query. Additionally or alternatively, responsive to a spoken query including an individual query, speaker module 126 broadcasts an audio response to the spoken query in a direction of a source of the spoken query. Additionally or alternatively, responsive to a spoken query including a group query, speaker module 126 broadcast audio responses in multiple directions, such as in directions of sources (e.g., users) identified in environment data from environment module 122. In one example, audio responses are broadcast in respective directions while being suppressed in other directions (e.g., suppressed in directions of some users, such as not broadcast in the directions of some users). In another example, an audio response is broadcast in an omni-directional manner.

Furthermore, speaker module 126 can broadcast an audio prompt to display an image. For instance, responsive to a spoken query not containing a display request based on query data from query module 124, speaker module 126 can provide a suggestion to display at least one image related to the spoken query by broadcasting an audio prompt (e.g., a suggestion), such as "Would you like to see a short video demonstration?". An audio prompt can be broadcast in any suitable manner, such as towards one or more users and not towards other users, or omni-directionally.

Projection module 128 receives environment data from environment module 122, query data form query module 124, and answer data from answer module 132. Projection module 128 projects an image for a spoken query based on the environment data, query data, and/or answer data. To project an image, projection module detects a presence of a surface that is visible from a user, such as a source of the spoken query or a user designated in query data. If projection module 128 is not able to detect the presence of a suitable surface, projection module 128 issues a command for an adjustment prompt.

An adjustment prompt may be any suitable indicator that an adjustment of a device, such as computing device 102 in FIG. 1, is needed to detect a suitable surface. In one example, an adjustment prompt includes a flashing light (e.g., a light on computing device 102 in FIG. 1) to indicate that a surface cannot be detected and the computing device should be adjusted, e.g., moved. Additionally or alternatively, an adjustment prompt can include to project an image in a direction, such as vertically towards a ceiling or towards one or more users. In one example, projection module 128 issues a command for an adjustment prompt to speaker module 126, and responsive to the adjustment prompt, speaker module 126 broadcasts an audible indication that adjustment is needed, such as "A surface cannot be detected; please adjust the device".

Projection module 128 configures a display mechanism, such as one or more projectors, based on a direction (e.g., a direction of a source of a spoken query) and a detected surface, and projects, with the display mechanism, an image on the surface. The image can be any suitable image indicated by answer data from answer module 132. Projection module 128 can simultaneously broadcast one or more images in one or more directions, such as separate images in separate directions or separate images in one direction (e.g., stereoscopic images to provide depth to an image by broadcasting an offset image together with an image that is not offset).

Furthermore, projection module 128 enables user input via an image projected on a surface, such as by enabling one or more IR cameras to detect when lasers are interrupted by movement of a user's finger when touching the image on the surface. By enabling user input via an image projected on a surface, projection module 128 enables a user to provide authentication parameters, such as a password or identification number, so that the user can be verified. In one example, a user is required to successfully authenticate via data entry on a projected keyboard before an image related to a spoken query is projected.

System 500 constitutes an improvement over systems which do not project an image related to a spoken query in a direction of a user, and do not distinguish between individual and group queries. By projecting an image, video, text, and the like related to a spoken query in the direction of a source of the spoken query, system 500 can provide a more complete and visual answer to a spoken query compared to providing only audio answers to the spoken query. In addition, user input can be enabled via the projected image to enable user verification without risk of eavesdropping. Furthermore, by distinguishing between individual and group queries, answers can be provided to intended users, without providing the answers to unintended users. Moreover, the answers can be tailored to specific users, such as by formatting the answers broadcast in different directions in different languages.

Having considered an example system 500, consider now a discussion of example procedures for directional display and audio broadcast in accordance with one or more aspects of the disclosure.

Example Procedures

Figure 6:
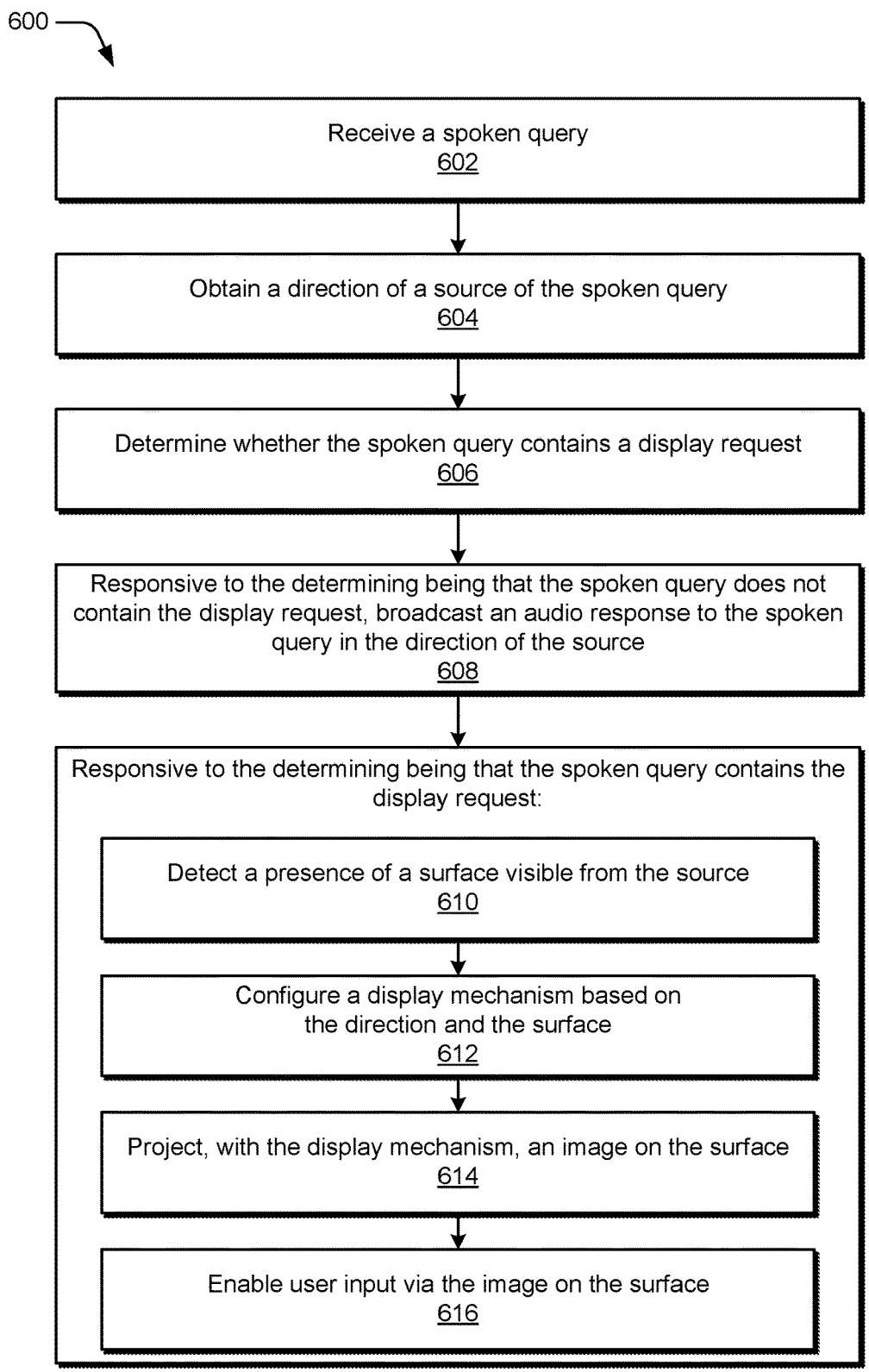
FIG. 6 is a flow diagram depicting an example procedure in accordance with one or more aspects of the disclosure.

FIG. 6 illustrates is a flow diagram depicting an example procedure 600 in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects the procedure may be performed in an environment by a suitably configured device, such as the example computing device 102 of FIG. 1 that makes use of a display, audio, and answer system, such as display, audio, and answer system 118. A display, audio, and answer system implementing procedure 600 may be an independent application that has been installed on a device (e.g., computing device 102), a service hosted by a service provider that is accessible by computing device 102, a plug-in module to computing device 102, or combinations thereof.

A spoken query is received (block 602). For instance, the spoken query can be received with a microphone array of a receiver module.

A direction of a source of the spoken query is obtained (block 604). In one example, obtaining the direction of the source comprises at least one of receiving a heat signature of the source, determining an angle from the spoken query, or obtaining an image of an environment containing the source. An image of the environment can include a 360-degree image.

It is determined whether the spoken query contains a display request (block 606). Determining whether the spoken query contains a display request can include detecting a trigger word in the spoken query, such as "show", "display", or "project".

Responsive to the determining being that the spoken query does not contain the display request, an audio response to the spoken query is broadcast in the direction of the source (block 608). In one example, responsive to the determining being that the spoken query does not contain the display request, broadcast of the audio response is suppressed in different directions than the direction of the source. Additionally or alternatively, responsive to the determining being that the spoken query does not contain the display request, a suggestion is provided to display at least one image related to the spoken query. Additionally or alternatively, responsive to the determining being that the spoken query does not contain the display request, the audio response is broadcast in a different direction than the direction of the source and in a different language than a language used for broadcasting the audio response in the direction of the source.

Responsive to the determining being that the spoken query contains the display request, blocks 610, 612, 614, and 616 are executed.

A presence of a surface visible from the source is detected (block 610). A surface can be detected in any suitable way, including audio or radar pings, an image from a camera, a map of a room from a database that indicates surfaces in the room, mechanical touch sensors, and the like.

A display mechanism is configured based on the direction and the surface (block 612). In one example, configuring the display mechanism comprises rotating the display mechanism in the direction of the source. Additionally or alternatively, configuring the display mechanism comprises moving the display mechanism towards the source.

An image is projected, with the display mechanism, on the surface (block 614). In one example, projecting the image on the surface comprises compensating for an angle of the surface relative to the display mechanism and a distance of the surface from the display mechanism. Compensation may result in the projected image on the surface being a desired shape and aspect ratio.

User input is enabled via the image on the surface (block 616). In one example, enabling user input comprises sensing the user input with at least one of an IR camera or a laser.

Figure 7:
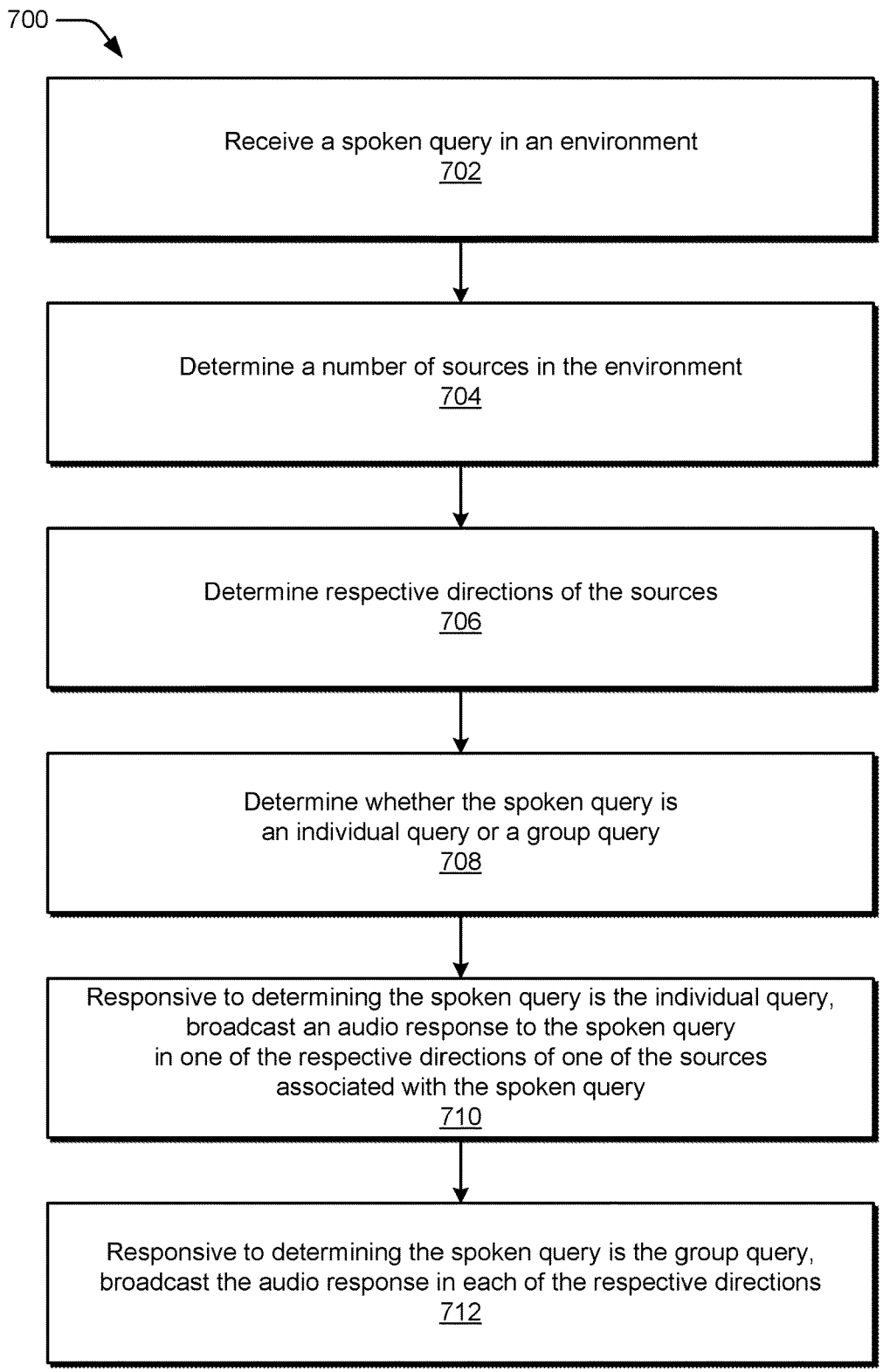
FIG. 7 is a flow diagram depicting an example procedure in accordance with one or more aspects of the disclosure.

FIG. 7 illustrates is a flow diagram depicting an example procedure 700 in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects the procedure may be performed in an environment by a suitably configured device, such as the example computing device 102 of FIG. 1 that makes use of a display, audio, and answer system, such as display, audio, and answer system 118. A display, audio, and answer system implementing procedure 700 may be an independent application that has been installed on a device (e.g., computing device 102), a service hosted by a service provider that is accessible by computing device 102, a plug-in module to computing device 102, or combinations thereof.

A spoken query in an environment is received (block 702). In one example, a microphone array receives the spoken query.

A number of sources in the environment is determined (block 704). The number of sources can be determined in any suitable way, such as with one or more thermal sensors, a 360-degree camera, analysis of the spoken query, combinations thereof, and the like.

Respective directions of the sources are determined (block 706). In one example, respective directions are determined by calculating a direction of arrival of the spoken query, such as by solving triangulation equations from signals from the microphone array.

It is determined whether the spoken query is an individual query or a group query (block 708). In one example, contextual analysis is performed on the spoken query and trigger words are identified and classified (e.g., grouped, weighted, and voted upon) to determine whether the spoken query is an individual query or a group query.

Responsive to determining the spoken query is an individual query, an audio response to the spoken query is broadcast in one of the respective directions of one of the sources associated with the spoken query (block 710). Broadcast of the audio response is suppressed in other directions.

Responsive to determining the spoken query is a group query, an audio response is broadcast in each of the respective directions (block 712). In one example, to broadcast the audio response in each of the respective directions comprises to broadcast the audio response in different languages in different respective directions. At least one language can be determined from a mobile device of one of the sources, the mobile device communicatively coupled to the device.

In one example, a projection module is configured to display at least one image related to the spoken query. The projection module can be configured to rotate or move in a direction of at least one of the sources. Additionally or alternatively, the projection module is further configured to detect a surface on which to display the at least one image, and when unable to detect the surface, provide a prompt indicating adjustment of the device is needed. A prompt may be audible, visible, vibratory (e.g., the device may vibrate), and combinations thereof.

Figure 8:
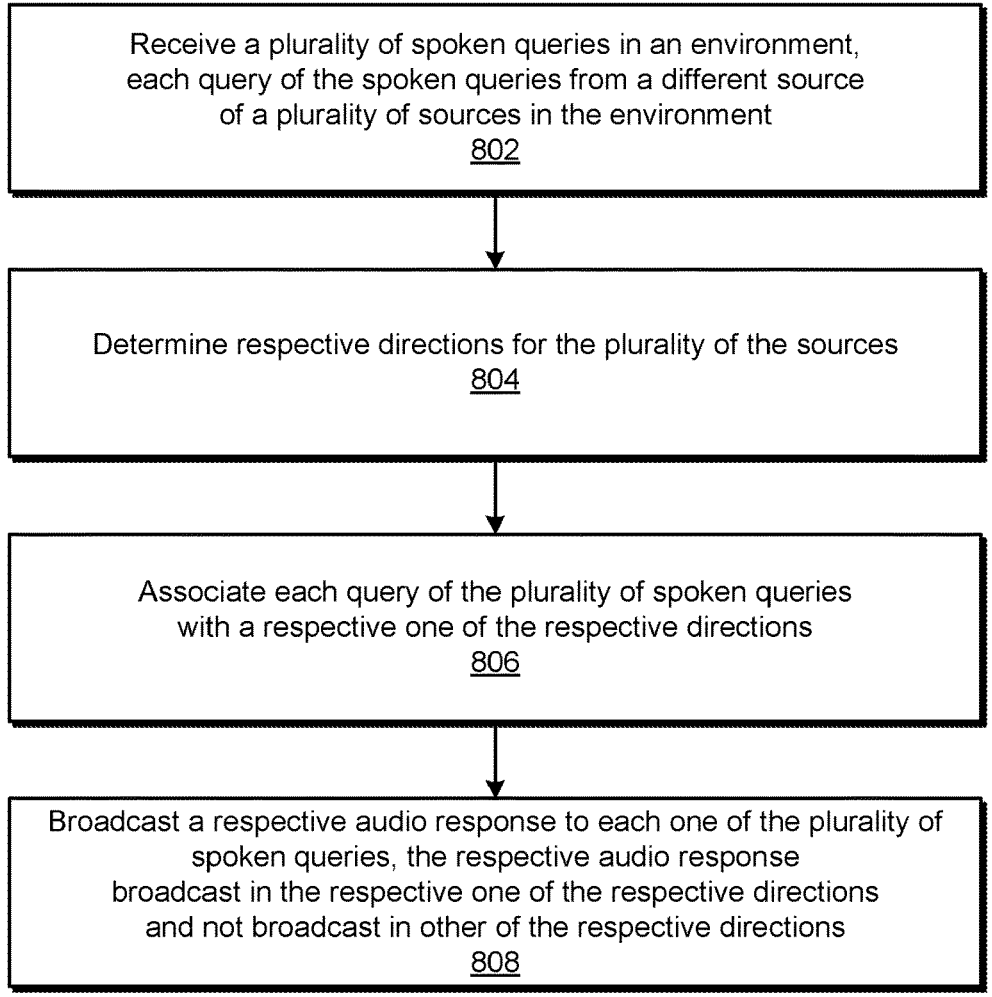
FIG. 8 is a flow diagram depicting an example procedure in accordance with one or more aspects of the disclosure.

FIG. 8 illustrates is a flow diagram depicting an example procedure 800 in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects the procedure may be performed in an environment by a suitably configured device, such as the example computing device 102 of FIG. 1 that makes use of a display, audio, and answer system, such as display, audio, and answer system 118. A display, audio, and answer system implementing procedure 800 may be an independent application that has been installed on a device (e.g., computing device 102), a service hosted by a service provider that is accessible by computing device 102, a plug-in module to computing device 102, or combinations thereof.

A plurality of spoken queries in an environment are received (block 802). Each query of the spoken queries is from a different source of a plurality of sources in the environment. The spoken queries may be in a same language or different languages.

Respective directions for the plurality of the sources are determined (block 804). The respective directions can be determined in any suitable way, such as from the plurality of spoken queries (e.g., by solving triangulation equations for direction-of-arrival calculations), thermal sensors, cameras, and the like.

Each query of the plurality of spoken queries is associated with a respective one of the respective directions (block 806). For instance, each query can be assigned a different identifier, and a respective direction can be assigned a matching identifier. The identifiers can be used to provide answers to spoken queries in correct directions (e.g., back to the sources of the spoken queries).

A respective audio response is broadcast to each one of the plurality of spoken queries (block 808). The respective audio response is broadcast in the respective one of the respective directions and not broadcast in other of the respective directions. In one example, the respective audio response to said each one of the plurality of spoken queries are broadcast simultaneously. Additionally or alternatively, for each direction of the respective directions, a respective image is displayed related to a respective query of the spoken queries associated with said each direction.

In one example, the respective audio response to at least one of the plurality of queries is in a different language than the respective audio response to another of the plurality of queries, and the different language is determined by at least one of a language pack installed on a mobile device in the environment, a language of the at least one of the plurality of queries, or a language specified by one of the plurality of sources.

The procedures described herein constitute an improvement over procedures which do not project an image related to a spoken query in a direction of a user, and do not distinguish between individual and group queries. By projecting an image, video, text, and the like related to a spoken query in the direction of a source of the spoken query, procedures described herein can provide a more complete and visual answer to a spoken query compared to providing only audio answers to the spoken query. In addition, user input can be enabled via the projected image to enable user verification without risk of eavesdropping. Furthermore, by distinguishing between individual and group queries, answers can be provided to intended users, without providing the answers to unintended users. Moreover, the answers can be tailored to specific users, such as by formatting the answers broadcast in different directions in different languages.

Having considered example procedures in accordance with one or more implementations, consider now a discussion of an example device having components through which aspects of directional display and audio broadcast can be implemented.

Example Device

Figure 9:
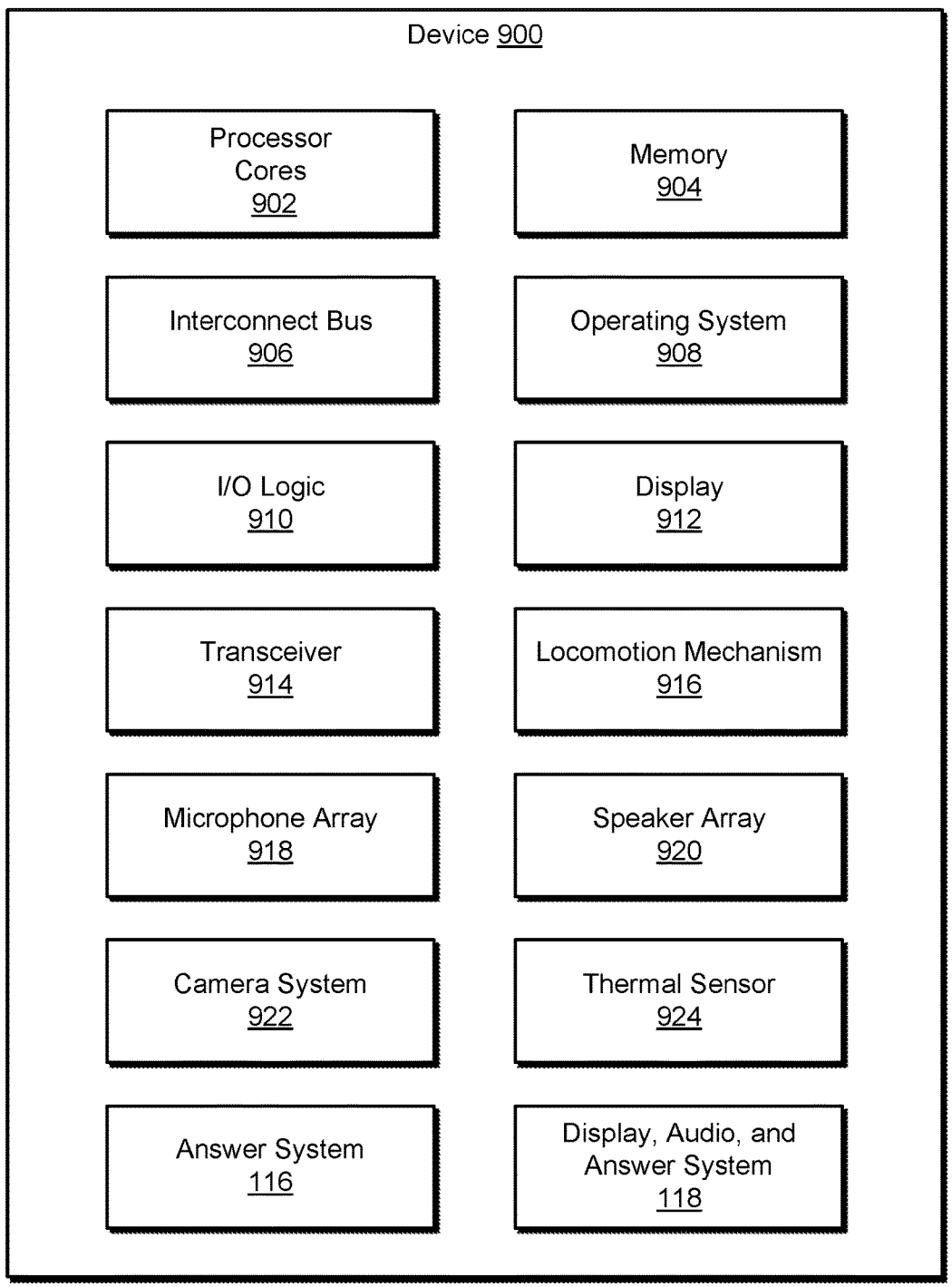
FIG. 9 illustrates an example device having components through which aspects of directional display and audio broadcast can be implemented in accordance with one or more aspects of the disclosure.

FIG. 9 illustrates an example device 900, which includes components capable of implementing aspects of directional display and audio broadcast. Device 900 may be implemented as, or in, any suitable electronic device, such as a computer, processor, a modem, broadband router, access point, cellular phone, smart-phone, gaming device, laptop computer, desktop computer, net book, tablet, set-top-box, smart-watch, virtual reality goggles, network-attached storage (NAS) device, echo device, and/or any other device that may directionally project an image and broadcast audio.

Device 900 may be integrated with a microprocessor, storage media, I/O logic, data interfaces, logic gates, a transmitter, a receiver, circuitry, firmware, software, and/or combinations thereof to provide communicative or processing functionalities. Device 900 may include a data bus (e.g., cross bar or interconnect fabric) enabling communication between the various components of the device. In some aspects, components of device 900 may interact via the data bus to implement aspects of directional display and audio broadcast.

In this particular example, device 900 includes processor cores 902 and memory 904. Memory 904 may include any suitable type of memory, such as volatile memory (e.g., DRAM), non-volatile memory (e.g., flash), cache, and the like. In the context of this disclosure, memory 904 is implemented as a storage medium, and does not include transitory propagating signals or carrier waves. Memory 904 can store data and processor-executable instructions of device 900, such as operating system 908 and other applications. Memory 904 can also store query data, environment data, answer data, display data, device data, and the like. Data storage 134 in FIG. 1 is an example of memory 904.

Processor cores 902 may execute operating system 908 and other applications from memory 904 to implement functions of device 900, the data of which may be stored to memory 904 for future access. For example, processor cores 902 may perform some functions of system 500 in FIG. 5, such as performing contextual analysis to generate query data, filter, categorize, and rank answer data, and generate control parameters (e.g., adaptive beamform weights) for a microphone array and/or a speaker array. Device 900 may also include I/O logic 910, which can be configured to provide a variety of I/O ports or data interfaces for communication. Device 900 also includes display 912. Display 912 may include any suitable type of display, such as a liquid crystal display (LCD), touchscreen, projection screen, and the like, and be configured to provide a user interface on device 900. Display 912 may also include one or more display mechanisms including projectors configurable to project an image on a surface.

Device 900 also includes transceiver 914. Transceiver 914 can include transmission and reception circuits for any suitable communications protocol, and support wired and wireless signaling. In one example, transceiver 914 includes communications module 130 in FIG.'s 1 and 5 and obtains device data from mobile device 108 and device 110 in FIG. 1. Additionally or alternatively, transceiver 914 may include receiver module 120 in FIG.'s 1 and 5, and enable communications via network 112 in FIG. 1.

Device 900 also includes locomotion mechanism 916. Locomotion mechanism 916 enables movement of device 900, such as to move in a plane (e.g., on a surface), elevate device 900 in height (e.g., raise or lower device 900 with respect to a plane), and rotate in any suitable axis. Accordingly, locomotion mechanism 916 can include an suitable locomotion mechanism disposed on device 900, such as wheels, balls, pads, tracks, gears, rails, cables, and the like.

Device 900 also includes microphone array 918 and speaker array 920. Microphone array 210 and speaker array 212 in FIG. 2 are examples of microphone array 918 and speaker array 920, respectively. Microphone array 918 and speaker array 920 can contain any number and type of respective microphones and respective speakers that can be electronically steered, such as by adjusting weights of an adaptive beamform. For instance, a beamform can be formed by summing weighted versions of signals from multiple microphones. Moreover, signals to speakers can be pre-multiplied by adaptive weights to beamform a speaker array. Weights can be real-valued or complex-valued. In one example, microphone array 918 and speaker array 920 contain respective microphones and respective speakers that can be mechanically steered, such as by rotating a mount holding a microphone and/or speaker.

Device 900 also includes camera system 922. Camera system 922 can include any suitable type of imaging device or devices to capture an image of an environment, such as environment 100 in FIG. 1. In one example, camera system 922 includes a 360-degree camera that can capture an image of an environment including all angles of the environment from the perspective of the 360-degree camera. Additionally or alternatively, camera system 922 can include one or more cameras that capture individual images of an environment that can be assembled to form a 360-degree view of the environment. In one example, a camera of camera system 922 can be moved (e.g., translated up or down and rotated) on device 900, such as by using components of locomotion mechanism 916.

Device 900 also includes thermal sensor 924. Thermal sensor 924 captures heat signatures in an environment, such as heat signatures of users 106 in environment 100 in FIG. 1. Thermal sensor 924 can include any number and type of sensors for capturing heat signatures, such as IR sensors, thermocouples, and the like. In one example, thermal sensor 924 and camera system 922 are included in environment module 122 in FIG.'s 1 and 5.

Device 900 also includes answer system 116 and display, audio, and answer system 118 in FIG. 1.

In one or more exemplary embodiments, the functions described may be implemented in hardware, software, firmware, or any combination thereof. If implemented in software, functions may be stored on a computer-readable storage medium (CRM). In the context of this disclosure, a computer-readable storage medium may be any available medium that can be accessed by a general-purpose or special-purpose computer that does not include transitory propagating signals or carrier waves. By way of example, and not limitation, such media can comprise RAM, ROM, EEPROM, CD-ROM or other optical disk storage, magnetic disk storage, or other magnetic storage devices, or any other non-transitory medium that can be used to carry or store information that can be accessed by a general-purpose or special-purpose computer, or a general-purpose or special-purpose processor. The information can include any suitable type of data, such as computer-readable instructions, sampled signal values, data structures, program components, or other data. These examples, and any combination of storage media and/or memory devices, are intended to fit within the scope of non-transitory computer-readable media. Disk and disc, as used herein, includes compact disc (CD), laser disc, optical disc, digital versatile disc (DVD), floppy disk and Blu-ray disc where disks usually reproduce data magnetically, while discs reproduce data optically with a laser. Combinations of the above should also be included within the scope of computer-readable media.

Firmware components include electronic components with programmable memory configured to store executable instructions that direct the electronic component how to operate. In some cases, the executable instructions stored on the electronic component are permanent, while in other cases, the executable instructions can be updated and/or altered. At times, firmware components can be used in combination with hardware components and/or software components.

The term "component", "module", and "system" are intended to refer to one or more computer related entities, such as hardware, firmware, software, or any combination thereof, as further described above. At times, a component may refer to a process and/or thread of execution that is defined by processor-executable instructions. Alternately or additionally, a component may refer to various electronic and/or hardware entities.

Certain specific embodiments are described above for instructional purposes. The teachings of this disclosure have general applicability, however, and are not limited to the specific embodiments described above.

CONCLUSION

Systems, devices, and techniques for directional display and audio broadcast are described. Contextual analysis of a spoken query determines whether the spoken query includes an individual query, a group query, and a display request. For an individual query, an audio response (e.g., answer) is broadcast in a directional manner towards the source of the spoken query, and broadcast of the audio response is suppressed in other directions. For a group query, an audio response is broadcast in more than one direction, such as omni-directionally or towards directions of users in an environment. For a display request, an image (e.g., picture, video, web page, and the like) is projected on a surface that is detected so the image is viewable by one or more users, such as the source of the spoken query. Multiple spoken queries and respective answers can be simultaneously processed, in a same or different language. Languages can be detected from spoken queries and devices in an environment, so that an audio response to a spoken query may be translated to a desired language to suit a particular user.

Hence, the systems, devices, and techniques described herein constitute an improvement over systems, devices, and techniques which do not project an image related to a spoken query in a direction of a user, and do not distinguish between individual and group queries. By projecting an image related to a spoken query in the direction of a source of the spoken query, the systems, devices, and techniques described herein can provide a more complete and visual answer to a spoken query compared to providing only audio answers to the spoken query. In addition, user input can be enabled via the projected image to enable user verification without risk of eavesdropping. Furthermore, by distinguishing between individual and group queries, answers can be provided to intended users, without providing the answers to unintended users. Moreover, the answers can be tailored to specific users, such as by formatting the answers broadcast in different directions in different languages.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:
1. A method comprising:
   receiving a spoken query;
   obtaining a direction of a source of the spoken query;
   determining whether the spoken query contains a display request;
   responsive to the determining being that the spoken query does not contain the display request:
      broadcasting an audio response to the spoken query in the direction of the source; and
      broadcasting the audio response in a different direction than the direction of the source and in a different language than a language used for broadcasting the audio response in the direction of the source; and responsive to the determining being that the spoken query contains the display request:

detecting a presence of a surface visible from the source;

configuring a display mechanism based on the direction and the surface;

projecting, with the display mechanism, an image on the surface; and enabling user input via the image on the surface.

2. The method as recited in claim 1, wherein the obtaining the direction of the source comprises one or more of:

receiving a heat signature of the source;

determining an angle from the spoken query; and obtaining an image of an environment containing the source.

3. The method as recited in claim 1, further comprising, responsive to the determining being that the spoken query does not contain the display request, suppressing broadcast of the audio response in different directions than the direction of the source.

4. The method as recited in claim 1, further comprising, responsive to the determining being that the spoken query does not contain the display request, providing a suggestion to display at least one image related to the spoken query.

5. The method as recited in claim 1, wherein the determining whether the spoken query contains the display request comprises detecting a trigger word in the spoken query.

6. The method as recited in claim 1, wherein the configuring the display mechanism comprises rotating the display mechanism in the direction of the source.

7. The method as recited in claim 1, wherein the configuring the display mechanism comprises moving the display mechanism towards the source.

8. The method as recited in claim 1, wherein the projecting the image on the surface comprises compensating for an angle of the surface relative to the display mechanism and a distance of the surface from the display mechanism.

9. A device comprising:

a receiver module that receives a spoken query in an environment;

an environment module that:

determines a number of sources in the environment; and determines respective directions of the sources;

a query module that determines whether the spoken query is an individual query or a group query;

an answer module that, when the spoken query is the individual query, determines that an answer to the individual query is intended for a source of the spoken query without being shared, and when the spoken query is the group query, determines that an answer to the group query is intended to be shared with the sources; and a speaker module that:

responsive to the query module determining the spoken query is the individual query, broadcasts an audio response to the spoken query in one of the respective directions of one of the sources associated with the spoken query; and responsive to the query module determining the spoken query is the group query, broadcasts the audio response in each of the respective directions.

10. The device as recited in claim 9, wherein the broadcasts the audio response in each of the respective directions comprises to broadcast the audio response in different languages in different respective directions.

11. The device as recited in claim 10, wherein at least one language is determined from a mobile device of one of the sources, the mobile device communicatively coupled to the device.

12. The device as recited in claim 9, further comprising a projection module that displays at least one image related to the spoken query, wherein the projection module moves in a direction of at least one of the sources.

13. The device as recited in claim 12, wherein the projection module detects a surface on which to display the at least one image, and when unable to detect the surface, provides a prompt indicating adjustment of the device is needed.

14. A system comprising:

a receiver module that receives a plurality of spoken queries in an environment, each query of the spoken queries from a different source of a plurality of sources in the environment;

a communications module that obtains location coordinates from a device of at least one source of the plurality of sources;

an environment module that determines respective directions for the plurality of the sources, at least one direction of the respective directions being determined from the location coordinates;

a query module that associates each query of the plurality of spoken queries with a respective one of the respective directions; and a speaker module that broadcasts a respective audio response to each one of the plurality of spoken queries, the respective audio response broadcast in the respective one of the respective directions and not broadcast in other of the respective directions.

15. The system as recited in claim 14, further comprising a projection module that displays, for each direction of the respective directions, a respective image related to a respective query of the spoken queries associated with said each direction.

16. The system as recited in claim 14, wherein the respective audio response to at least one of the plurality of queries is in a different language than the respective audio response to another of the plurality of queries, and the different language is determined by one or more of a language pack installed on a mobile device in the environment, a language of the at least one of the plurality of queries, and a language specified by one of the plurality of sources.

17. The method as recited in claim 1, further comprising, responsive to the determining being that the spoken query contains the display request:

receiving a user authorization code as the user input via the image projected on the surface; and projecting, based on verifying the user authorization code, an additional image related to the spoken query on the surface.

18. The device as recited in claim 9, wherein the speaker module, responsive to the query module determining the spoken query is the group query, is configured to broadcast the audio response in each of the respective directions by:

broadcasting the audio response omni-directionally when languages of the sources are a same language; and broadcasting the audio response directionally in said each of the respective directions when languages of the sources are not the same language.

19. The system as recited in claim 14, wherein the at least one direction is determined from the location coordinates by applying an offset to the location coordinates.

20. The method as recited in claim 1, further comprising determining the language used for broadcasting the audio response in the direction of the source from a mobile device of the source.

* * * * *